(12) United States Patent
Park et al.

(10) Patent No.: US 10,871,845 B2
(45) Date of Patent: Dec. 22, 2020

(54) TOUCH DISPLAY PANEL AND TOUCH DISPLAY DEVICE

(71) Applicant: LG Display Co., Ltd., Seoul (KR)

(72) Inventors: YongChan Park, Paju-si (KR); Jinseong Kim, Paju-si (KR); Haewon Lee, Paju-si (KR); JuHan Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/722,839

(22) Filed: Dec. 20, 2019

(65) Prior Publication Data
US 2020/0201468 A1    Jun. 25, 2020

(30) Foreign Application Priority Data
Dec. 21, 2018 (KR) .......................... 10-2018-0167751

(51) Int. Cl.
*G06F 3/041* (2006.01)
*G06F 3/044* (2006.01)

(52) U.S. Cl.
CPC .......... *G06F 3/0412* (2013.01); *G06F 3/0446* (2019.05); *G06F 2203/04107* (2013.01)

(58) Field of Classification Search
CPC .............. G06F 3/0412; G06F 3/0446; G06F 2203/04107; G06F 3/0418; G06F 3/0443; G06F 3/04166; G06F 3/04184; G06F 3/04164
See application file for complete search history.

(56) References Cited

U.S. PATENT DOCUMENTS

| | | | |
|---|---|---|---|
| 2013/0155024 A1* | 6/2013 | Chung | G06F 3/0412 345/175 |
| 2013/0285971 A1* | 10/2013 | Elias | H03K 17/955 345/174 |
| 2013/0321730 A1 | 12/2013 | Huang | |
| 2017/0110487 A1 | 4/2017 | Ding | |
| 2017/0192610 A1* | 7/2017 | Park | G02F 1/134309 |
| 2018/0145114 A1* | 5/2018 | Sim | H01L 27/3276 |

FOREIGN PATENT DOCUMENTS

| | | |
|---|---|---|
| CN | 106095198 A | 11/2016 |
| EP | 3187985 A1 | 7/2017 |
| EP | 3309662 A1 | 4/2018 |
| KR | 10-2017-0081068 A | 7/2017 |

OTHER PUBLICATIONS

Extended European Search Report issued in European Patent Application No. 19216489.5 dated May 7, 2020.

* cited by examiner

*Primary Examiner* — Abhishek Sarma
(74) *Attorney, Agent, or Firm* — Morgan, Lewis & Bockius LLP

(57) ABSTRACT

Disclosed are a touch display panel and a touch display device. In a touch display panel and a touch display device, a shielding pattern is arranged between a data link line and a touch link line in a non-active area of the touch display panel, and a signal corresponding to the touch driving signal is applied to the shielding pattern. Parasitic capacitance between the data link line and the touch link line is prevented in order to reduce noise on the touch sensing signal caused by voltage fluctuation on the data link line. Accordingly, it is possible to reduce the influence of display driving on touch sensing, thereby improving touch sensing during display driving.

23 Claims, 21 Drawing Sheets

TOUCH DISPLAY PANEL AND TOUCH DISPLAY DEVICE

CROSS REFERENCE TO RELATED APPLICATION

This application claims priority from Korean Patent Application No. 10-2018-0167751, filed on Dec. 21, 2018.

BACKGROUND

1. Technical Field

The present disclosure relates to a touch display panel and a touch display device.

2. Discussion of the Related Art

As the information society develops, the demand for display devices for displaying images is increasing in various forms. Various types of display devices such as a liquid crystal display device (LCD), and an organic light emitting display device (OLED) have been used for this purpose.

In order to provide the user with various functions, the display device may provide a function of recognizing the user's touch on the display panel and performing input processing based on the recognized touch.

The display device capable of recognizing a touch, for example, may apply the touch driving signal to a plurality of touch electrodes disposed on or embedded in the display panel, and may detect the presence or absence of touch and the touch coordinates by sensing a change in capacitance caused by a user's touch.

In the display device capable of providing the touch recognition function, electrodes and signal lines to which various voltages, signals for driving the display are applied may be arranged on the display panel. Therefore, there may be a problem that the performance of the touch sensing may be degraded due to the parasitic capacitances generated between electrodes and lines for driving the display and electrodes and lines for touch sensing.

SUMMARY

Accordingly, embodiments of the present disclosure are directed to a touch display panel and a touch display device that substantially obviate one or more of the problems due to limitations and disadvantages of the related art.

An aspect of embodiments of the present disclosure is to provide a touch display panel and a touch display device capable of reducing noise of touch sensing by reducing the parasitic capacitance generated between electrodes and lines for driving the display and electrodes and lines for touch sensing which are disposed in the display panel.

Another aspect of the present disclosure is to provide a touch display panel and a touch display device for easily implementing a structure capable of reducing the noise of the touch sensing without adding the process steps of the touch display panel.

Another aspect of the present disclosure is to provide a touch display panel and a touch display device capable of improving the performance of the touch sensing by reducing the noise of the touch sensing due to the electrode and the line for driving the display, and to perform the touch sensing simultaneously with the display driving.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a touch display panel comprises at least one driving circuit for driving a plurality of data lines and a plurality of touch lines arranged in an active area of the touch display panel; a plurality of first data link lines disposed in a non-active area of the touch display panel and electrically connected to the driving circuit; a plurality of second data link lines disposed in the non-active area and electrically connected between each of the plurality of first data link lines and each of the plurality of data lines; a plurality of touch link lines disposed in the non-active area and electrically connected between the driving circuit and each of the plurality of touch lines, at least a portion of the touch link lines overlapping with at least one of the plurality of first data link lines and the plurality of second data link lines; and a shielding pattern disposed in the non-active area and disposed in a layer between the plurality of first data link lines and the plurality of touch link lines, the shielding pattern overlapping at least a portion of the plurality of touch link lines.

In this touch display panel, the shielding pattern may be further disposed between the plurality of second data link lines and the plurality of touch link lines.

Also, the shielding pattern may be formed integrally with at least one of a dummy pixel electrode and a dummy common electrode disposed outside the active area.

A touch display panel may include: at least one driving circuit for driving a plurality of data lines and a plurality of touch lines arranged in an active area; a plurality of data link lines disposed in a non-active area and electrically connected between the driving circuit and each of the plurality of data link lines; a plurality of touch link lines disposed in the non-active area and electrically connected between the driving circuit and each of the plurality of touch lines, at least a portion of which overlaps with at least one of the plurality of data link lines; and a shielding pattern disposed in the non-active area and disposed in a layer between the plurality of data link lines and the plurality of touch link lines, overlapping at least a portion of the plurality of touch link lines, and to which a signal corresponding to a signal applied to the plurality of touch link lines is applied during at least a touch sensing period. The shielding pattern may be electrically connected to at least one of the driving circuit, the plurality of touch link lines, a dummy pixel electrode and a dummy common electrode disposed outside the active area. The shielding pattern may be formed integrally with at least one of a dummy pixel electrode and a dummy common electrode disposed outside the active area.

In accordance with another aspect of the present disclosure, there may be provided a display device including the display panel as described above. In the touch display device, the first data link line and the second data link line may be electrically connected to each other through at least one contact hole included in an insulation layer disposed between the first data link line and the second data link line, and the shielding pattern may further be disposed between the plurality of second data link lines and the plurality of touch link lines. The shielding pattern may be formed integrally with at least one of a dummy pixel electrode and a dummy common electrode disposed in the link area.

The shielding pattern to which a signal corresponding to the touch driving signal is applied may be disposed between the data link line and the touch link line disposed in the link area of the touch display panel, so that it is possible to reduce the noise due to parasitic capacitance between the data link line and the touch link line.

In addition, it is possible to easily arrange the shielding pattern without adding a separate process step by arranging the shielding pattern using one of the metals arranged in the link area.

Further, the performance of the touch sensing performed simultaneously with the display driving can be improved by reducing the noise of the touch sensing due to the data link line through the arrangement of the shielding pattern.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
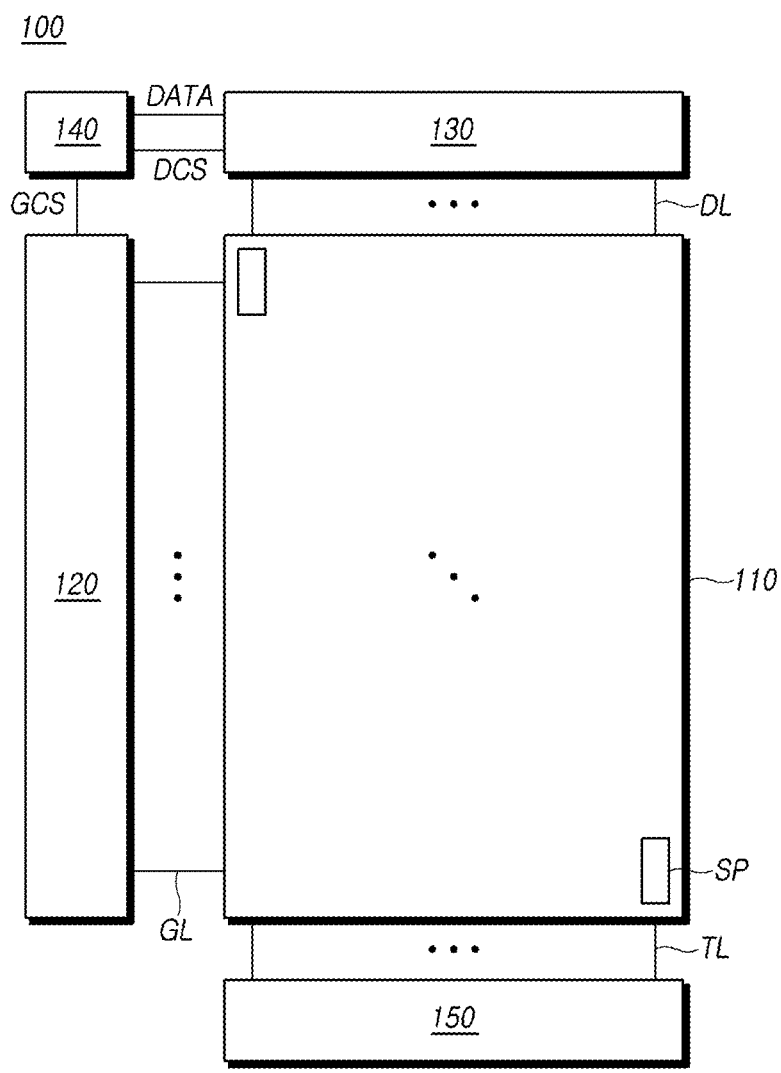
FIG. 1 is a diagram illustrating a schematic configuration of a touch display device.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 is a diagram illustrating a schematic configuration of a display device 100.

Referring to FIG. 1, the display device 100 may include a touch display panel 110, a gate driving circuit 120, a data driving circuit 130 and a controller 140. The display device 100 may further include a touch driving circuit 150 for sensing the touch of the touch display panel 110.

In the touch display panel 110, a plurality of gate lines GL and a plurality of data lines DL are arranged, and a plurality of subpixels SP may be arranged in an area where the gate lines GL and the data lines DL intersect each other A plurality of touch electrodes TE may be disposed or embedded in the touch display panel 110, and a plurality of touch lines TL electrically connecting the touch electrode TE and the touch driving circuit 150 may be disposed.

The configuration for driving the display in the touch display device 100 will be described first. The gate driving circuit 120 may control the driving timing of the subpixel SP disposed on the touch display panel 110. The data driving circuit 130 may supply the data voltage Vdata corresponding to the image data to the subpixel SP so that the subpixel SP displays the image by indicating the brightness corresponding to the gray level of the image data.

More specifically, the gate driving circuit 120 is controlled by the controller 140 and sequentially outputs scan signals to a plurality of gate lines GL disposed on the touch display panel 110 so as to control the driving timing of the subpixel SP.

The gate driving circuit 120 may include at least one gate driver integrated circuit (GDIC), and may be located only on one side of the touch display panel 110 according to the driving method, or on both sides of the touch display panel 110 according to the driving method.

Each gate driver integrated circuit (GDIC) may be connected to the bonding pad of the touch display panel 110 by a tape automated bonding (TAB) method or a chip on glass (COG) method. Alternatively, each gate driver integrated circuit (GDIC) may be implemented as a gate-in-panel (GIP) type and directly disposed on the touch display panel 110, or may be integrated on the touch display panel 110. In addition, each gate driver integrated circuit (GDIC) may be implemented by a chip on film (COF) method, which is mounted on a film connected to the touch display panel 110.

The data driving circuit 130 may receive image data (or input data) from the controller 140, and may convert the image data into the analog-type data voltage. The data voltages may be outputted to the respective data lines DL in accordance with the applying timing of the scan signals through the gate lines GL so that each subpixel SP expresses the brightness according to the image data.

The data driving circuit 130 may include one or more source driver integrated circuits (SDICs).

Each source driver integrated circuit (SDIC) may include a shift register, a latch circuit, a digital-to-analog converter, an output buffer, and the like.

Each source driver integrated circuit (SDIC) may be connected to a bonding pad of the touch display panel 110 by a tape automated bonding (TAB) method or a chip on glass (COG) method. Alternatively, each source driver integrated circuit (SDIC) may be directly disposed on the touch display panel 110, or may be integrated and disposed on the touch display panel 110 depending on the case. In addition, each source driver integrated circuit (SDIC) may be implemented in a chip-on-film (COF) manner, and in this case, each source driver integrated circuit (SDIC) may be mounted on a film connected to the touch display panel 110 and may be electrically connected to the touch display panel 110 through lines on the film.

The controller 140 may supply several control signals to the gate driving circuit 120 and the data driving circuit 130 and may control the operations of the gate driving circuit 120 and the data driving circuit 130.

The controller 140 may control the gate driving circuit 120 to output the scan signal in accordance with the timing to be implemented in each frame, and may convert the image data received from the outside in accordance with the data signal format used by the data driving circuit 130, and may output the converted image data to the data driving circuit 130.

The controller 140 may receive several timing signals including a vertical synchronizing signal (VSYNC), a horizontal synchronizing signal (HSYNC), an input data enable signal (DE), a clock signal (CLK) in addition to the image data from the outside (e.g., the host system).

The controller 140 may generate various control signals using timing signals received from the outside, and may output the control signals to the gate driving circuit 120 and the data driving circuit 130.

For example, in order to control the gate driving circuit 120, the controller 140 may output various gate control signals (GCS) including a gate start pulse (GSP), a gate shift clock (GSC), a gate output enable signal (GOE) and the like.

Here, the gate start pulse (GSP) may control the operation start timing of one or more gate driver integrated circuit (GDIC) constituting the gate driving circuit 120. The gate shift clock (GSC) is a clock signal commonly input to one or more gate driver integrated circuits (GDIC), and controls the shift timing of the scan signal. The gate output enable signal (GOE) may specify the timing information of one or more gate driver integrated circuits (GDICs).

In order to control the data driving circuit 130, the controller 140 may output various data control signals (DCS) including a source start pulse (SSP), a source sampling clock (SSC), a source output enable signal (SOE), and the like.

Here, the source start pulse (SSP) controls the data sampling start timing of one or more source driver integrated circuits (SDIC) constituting the data driving circuit 130. The source sampling clock (SSC) is a clock signal for controlling the sampling timing of data in each of the source driver integrated circuits (SDIC). The source output enable signal (SOE) controls the output timing of the data driving circuit 130.

The touch display device 100 may further include a power management integrated circuit (not shown) capable of supplying various voltages or currents to the touch display panel 110, the gate driving circuit 120, the data driving circuit 130, and the touch driving circuit 150 or capable of controlling various voltages or currents to be supplied.

Each of the subpixels SP may be defined by the intersection of the gate line GL and the data line DL, and the liquid crystal or the light emitting element may be disposed in each subpixel depending on the type of touch display device 100.

For example, in the case that the touch display device 100 is a liquid crystal display device, the liquid crystal display device may include a light source device such as a backlight unit that emits light to the touch display panel 110, and the liquid crystal may be arranged in the subpixel of the touch display panel 110. Also, the image can be displayed indicating the brightness according to the image data by adjusting the arrangement of the liquid crystal by the electric field formed by the data voltage Vdata applied to each subpixel SP.

As another example, in the case that the touch display device 100 is an organic light emitting display device, an organic light emitting diode (OLED) may be disposed in each of the subpixels SP, and it is possible to display the brightness according to the image data by controlling the current flowing through the organic light emitting diode (OLED) based on the data applied to each subpixel SP.

Alternatively, the light emitting diode (LED) may be disposed in each subpixel SP to display an image.

The touch display device 100 may detect the user's touch for the touch display panel 110 by using the touch electrode TE and the touch driving circuit 150 included in the touch display panel 110.

Figure 2:
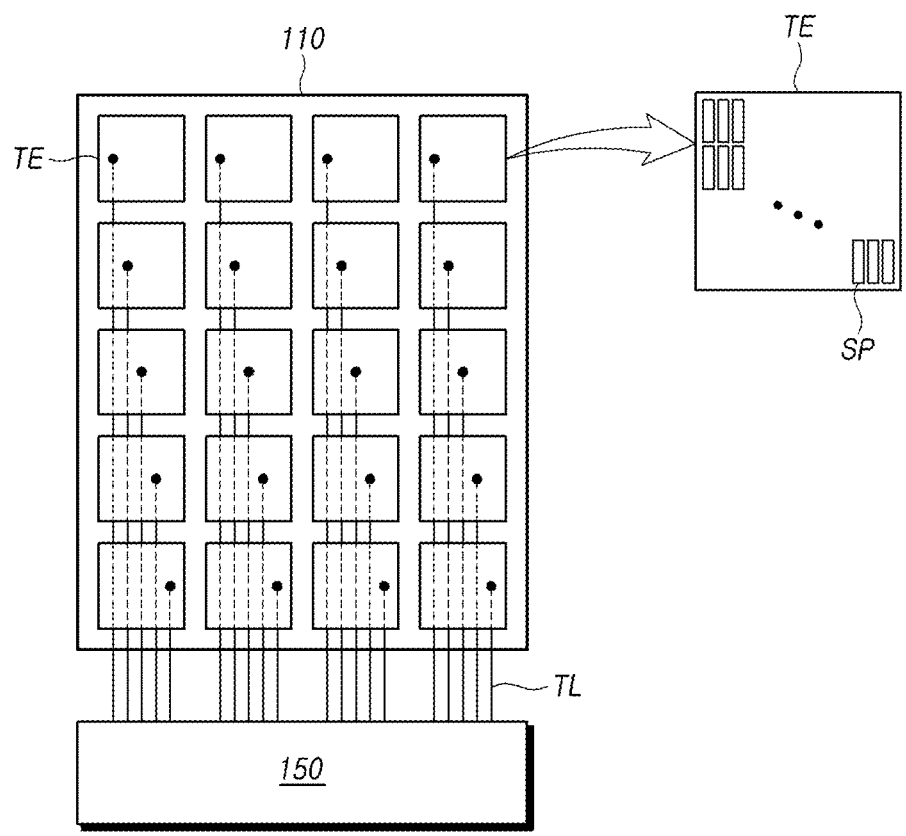
FIG. 2 illustrates an example of the arrangement structure of touch electrodes included in the touch display device.

FIG. 2 illustrates an example of the touch electrode TE disposed on the touch display panel 110 and the touch drive circuit 150 driving the touch electrode TE in the touch display device.

Referring to FIG. 2, the touch display panel 110 may include a plurality of touch electrodes TE and a plurality of touch lines TL for connecting the touch electrodes TE to the touch driving circuit 150.

The touch electrode TE may be disposed on the touch display panel 110 or may be embedded therein. The touch electrode TE may be an electrode used for driving the display, or the touch electrode TE may be an electrode separately disposed for touch sensing. Further, the touch electrode TE may be in the form of a transparent single electrode having no open region, or may be in the form of an opaque mesh. Alternatively, the touch electrode TE may be in the form of a transparent electrode in which the open region is partially present.

For example, in the case that the touch display device 100 is the liquid crystal display device, the touch electrode TE may be embedded in the touch display panel 110, and may be the common electrode to which the common voltage Vcom is applied.

That is, the common electrode may be arranged in a divided structure in the touch display panel 110 and may be used as the touch electrode TE for touch sensing. Therefore, each of the touch electrodes TE may be disposed in overlapping with the plurality of subpixels SP.

By way of an example, the touch display device 100 may be a liquid crystal display device for convenience of explanation, but is not limited thereto.

The touch electrode TE may be electrically connected to the touch driving circuit 150 through the touch line TL disposed on the touch display panel 110.

The touch driving circuit 150 may include an amplifier for outputting the touch driving signal TDS to the touch electrode TE and receiving the touch sensing signal TSS from the touch electrode TE, an integrator for integrating the output signal of the amplifier, and an analog-to-digital converter for converting the output signal of the integrator into a digital signal.

The touch driving circuit 150 may be integrated with the data driving circuit 130 depending on the case.

The touch driving circuit 150 may be connected to the touch electrode TE in a one-to-one manner to receive the touch sensing signal TSS. That is, the touch driving circuit 150 may output the touch driving signal TDS to the touch electrode TE through the touch line TL and may receive the touch sensing signal TSS so as to sense the change of self-capacitance caused by a touch.

Alternatively, the touch electrode TE may be disposed to be divided into the driving electrode and the sensing electrode, and the touch driving circuit 150 may be connected to the driving electrode and the sensing electrode, respectively. In this case, the touch driving circuit 150 may output the touch driving signal TDS to the driving electrode and may receive the touch sensing signal TSS from the sensing electrode so as to sense the change of mutual capacitance between the driving electrode and the sensing electrode.

The touch driving circuit 150 may convert the received touch sensing signal TSS into sensing data in digital form and may transmit the converted sensing data to the touch controller.

The touch controller may control the driving of the touch driving circuit 150, and may receive the sensing data from the touch driving circuit 150 and detect the touch of the user to the touch display panel 110 based on the received sensing data.

That is, the touch controller can detect the change of the self-capacitance or the change of the mutual capacitance from the sensing data, and detect the presence or absence of the touch, the touch coordinate, and the like based on the detected change of the capacitance.

Furthermore, the touch driving circuit 150 may perform touch sensing during the period time-divided with the display driving period, or may perform touch sensing at the same time as the display driving period.

Figure 3:
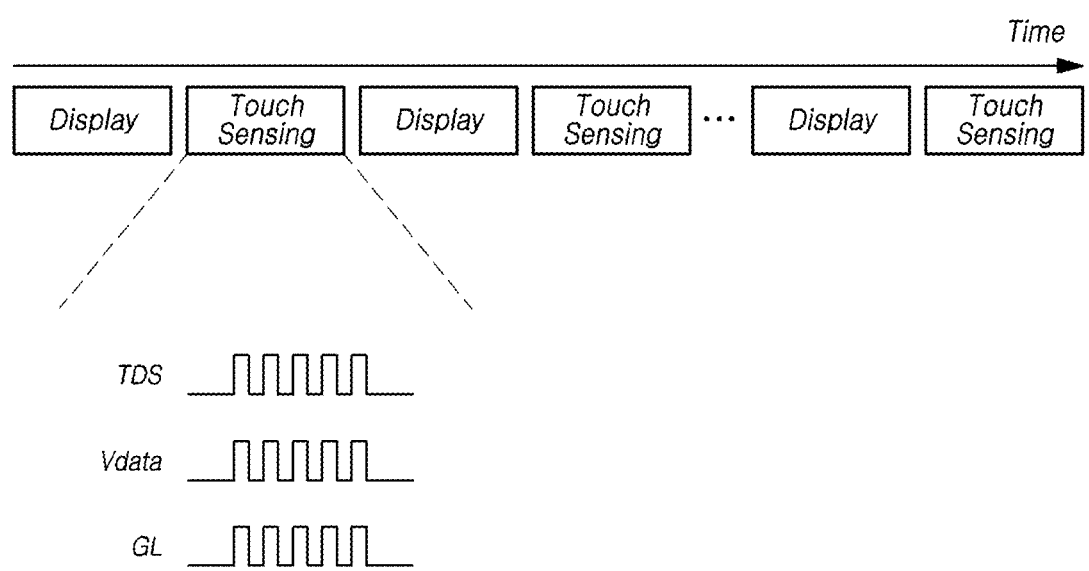
FIG. 3 illustrates an example of the timing of the touch sensing and the display driving of the touch display device.

FIG. 3 is a diagram illustrating an example of the timing of the touch sensing and the display driving of the touch display device 100. In this case, the display driving and touch sensing are performed in time divided periods.

Referring to FIG. 3, the touch display device 100 may drive the touch electrode TE included in the touch display panel 110 during a period (e.g., a blank period) between display driving periods so as to perform touch sensing.

For example, the touch display device 100 may perform touch sensing in the vertical blank period existing for each image frame. Alternatively, touch sensing may be performed in some horizontal blank periods among a plurality of horizontal blank periods existing in one image frame.

In the case that the common electrode included in the touch display panel 110 is used as the touch electrode TE, the common voltage Vcom may be applied to the touch electrode TE through the touch line TL connected to each touch electrode TE during the display driving period, and the touch driving signal TDS may be applied to the touch electrode TE through the touch line TL connected to each touch electrode TE during the touch sensing period.

The touch driving signal TDS may be a pulse-shaped signal whose voltage varies with time.

Here, since the display driving is not performed during the touch sensing period, the electrodes, the signal lines, and the like for driving the display may be in a voltage-unapplied state or in a constant voltage state. Therefore, the parasitic capacitance can be formed between the touch electrode TE to which the touch driving signal TDS is applied and the gate line GL, the data line DL and the like, and the sensing performance for the touch sensing signal TSS may be deteriorated due to such parasitic capacitance.

In order to prevent the parasitic capacitance formed between the touch electrode TE and the gate line GL, the data line DL and the like, the correspondent signal corresponding to the touch driving signal TDS applied to the touch electrode TE can be supplied to the gate line GL and the data line DL during the touch sensing period.

That is, as shown in the example shown in FIG. 3, the data voltage Vdata having the same voltage difference and phase as the touch driving signal TDS can be supplied to the data line DL. In the touch sensing period, since the gate low voltage VGL is applied to the gate line GL, the signal having the same voltage difference and phase as the touch driving signal TDS may be outputted as the gate line voltage VGL, so that the signal having the same voltage difference and phase as the touch driving signal TDS may be supplied to the gate line GL.

In this manner, by supplying the signal having the same voltage difference and phase as the touch driving signal TDS to the gate line GL and the data line DL during the touch sensing period as described above, the parasitic capacitance between the touch electrode TE and the signal line may not be formed, and the detection performance of the touch sensing signal TSS can be improved.

The touch display device 100 may simultaneously perform display driving and touch sensing.

Figure 4:
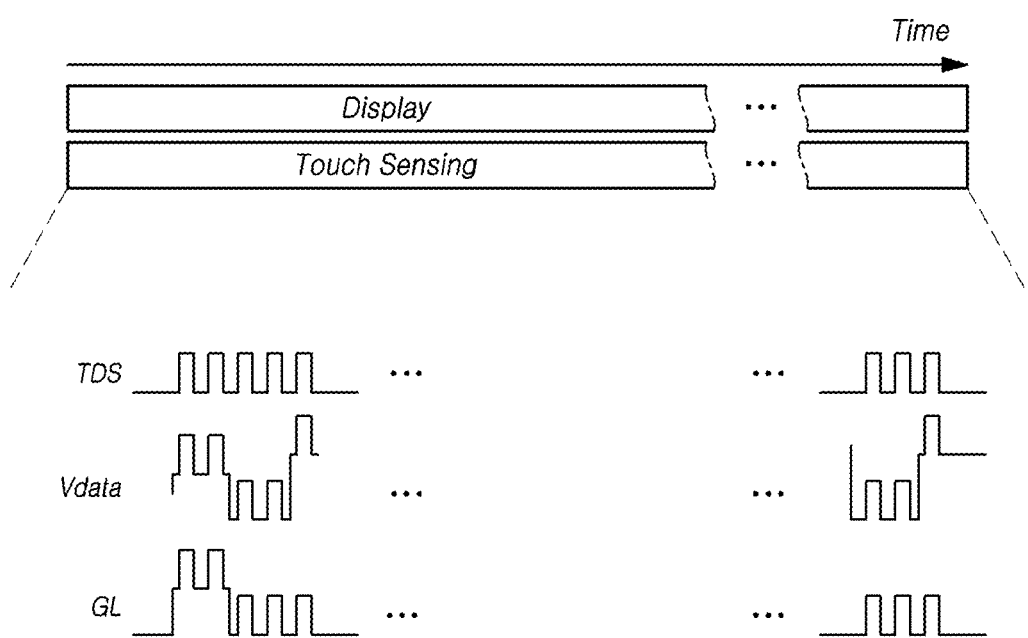
FIG. 4 illustrates another example of the timing of the touch sensing and the display driving of the touch display device.

FIG. 4 is a diagram illustrating another example of the timing of the touch sensing and the display driving of the touch display device 100, in which display driving and touch sensing are simultaneously performed.

Referring to FIG. 4, the touch display device 100 may perform touch sensing at the same time as the display driving period.

Here, the touch sensing period may be the same as the display driving period, or may be the blank period between the display driving periods. That is, the touch sensing can be performed independently of the display driving, and the touch sensing may be performed simultaneously with the display driving.

In the case that the touch sensing is performed simultaneously with the display driving, the touch driving signal TDS may be applied to the touch electrode TE. The data voltage Vdata may be supplied to the data line DL for driving the display and the scan signal generated using the gate high voltage VGH and the gate low voltage VGL may be output to the gate line GL.

At this time, in the case that the common electrode included in the touch display panel 110 is used as the touch electrode TE, since the touch driving signal TDS is applied to the touch electrode TE, the voltage difference corresponding to the image data may not be formed between the common electrode and the pixel electrode to which the data voltage Vdata is applied.

That is, since the voltage of the touch driving signal TDS varies with time, the voltage difference corresponding to the image data may not be formed between the common electrode to which the touch driving signal TDS is applied and the pixel electrode. Accordingly, the subpixel SP may not display the brightness corresponding to the image data.

Therefore, by supplying the data voltage Vdata modulated based on the touch driving signal TDS to the data line DL, the voltage difference corresponding to the image data can be formed between the common electrode to which the touch driving signal TDS is applied and the pixel electrode.

The modulation of such the data voltage Vdata may be performed, for example, by a method of modulating the gamma voltage used to generate the data voltage Vdata in the data driving circuit 130. Alternatively, the modulated data voltage Vdata may be supplied to the data line DL by modulating the ground voltage disposed in the touch display panel 110.

Also, by modulating the gate low voltage VGL based on the touch driving signal TDS, the modulated scan signal may be applied to the gate line GL so that the gate line GL can be normally driven.

As described above, the display driving and the touch sensing can be performed simultaneously by modulating the data voltage Vdata applied to the data line DL and the scan signal applied to the gate line GL based on the touch drive signal TDS.

Figure 5:
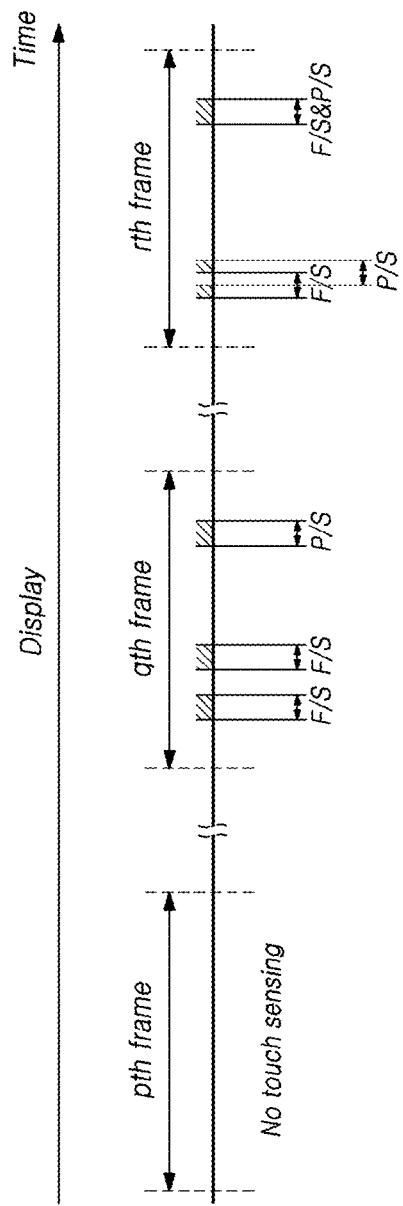
FIG. 5 illustrates various examples of timing of finger sensing and pen sensing according to the timing of the touch sensing and the display driving shown in FIG. 4.

FIG. 5 illustrates various examples of timing of finger sensing and pen sensing according to the timing of the touch sensing and the display driving shown in FIG. 4.

Referring to FIG. 5, the touch display device 100 may perform only the display driving, or may perform the touch sensing at the same time as the display driving. Also, the touch sensing may be performed only during a part of the display driving period, and the finger sensing (F/S) and pen sensing (P/S) may be performed in different periods or in the same period.

For example, as in the p-th frame, the touch display device 100 may perform only the display driving operation without performing touch sensing such as finger sensing (F/S) and pen sensing (P/S) during one frame.

Alternatively, as in the q-th frame, the touch display device 100 may perform touch sensing such as the finger sensing (F/S) or pen sensing (P/S) during a partial period during which the touch sensing is required during the display driving period, Here, the finger sensing (F/S) and pen sensing (P/S) may be performed in respective periods not overlapping with each other.

Alternatively, as in the r-th frame, the touch display device 100 may perform touch sensing during the display driving period and may perform finger sensing (F/S) and pen sensing (P/S) during the overlapped period. In this case, the sensing result of each of the finger sensing (F/S) and pen sensing (P/S) can be distinguished through an algorithm determined by the touch controller or signal analysis according to sensing position.

In addition to these examples, display driving and touch sensing (finger sensing, pen sensing) can be performed independently at various timings.

As described above, the touch sensing period can be sufficiently secured and the performance of the touch sensing can be improved by performing the touch sensing independently of the display driving. However, in this case, the parasitic capacitance due to the driving of the display can cause the noise on the touch sensing signal TSS as the display driving is performed simultaneously.

Figure 6:
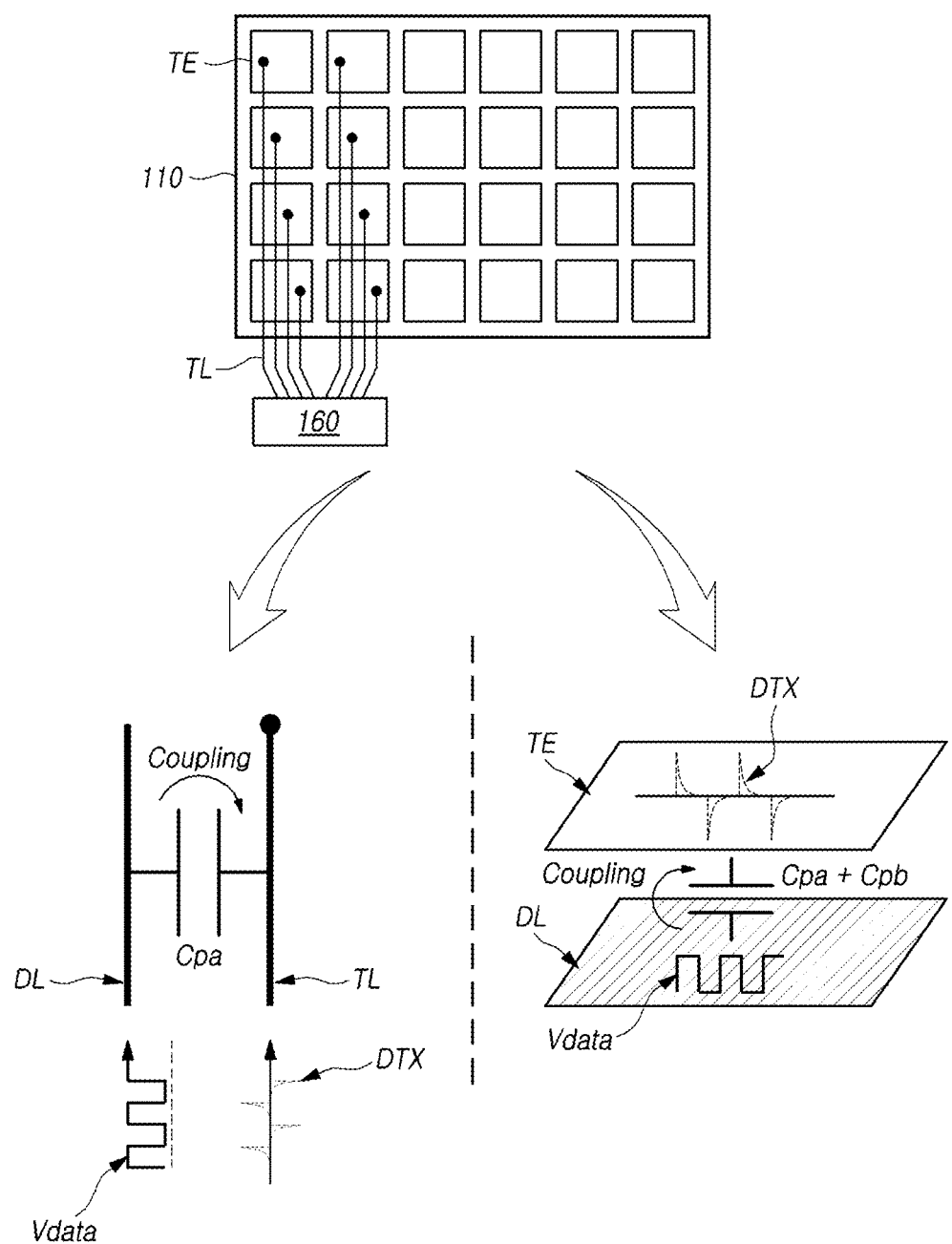
FIG. 6 illustrates an example of the noise on the touch sensing signal due to the parasitic capacitance between the touch electrode/line and the data line in the touch display device.

FIG. 6 illustrates an example of the noise on the touch sensing signal due to the parasitic capacitance between the touch electrode TE, the touch line TL and the data line DL in the touch display device 100.

Referring to FIG. 6, the plurality of touch electrodes TE and the plurality of touch lines TL may be arranged on the touch display panel 110. The example of FIG. 6 illustrates the case in which the driving circuit 160 integrating the data driving circuit 130 and the touch driving circuit 150 drives the touch line TL.

In the touch display device 100, at least a part of the touch line TL may be arranged to overlap with the data line DL. Accordingly, the parasitic capacitance Cpa may be formed between the data line DL and the touch line TL.

Alternatively, the parasitic capacitance Cpa may be formed between the adjacent touch lines TL and the data lines DL even if the touch lines TL are not overlapped with the data lines DL.

Since the data line DL and the touch line TL are coupled by the parasitic capacitance Cpa, the data line DL, the crosstalk DTX may occur in the touch sensing signal TSS detected through the touch line TL according to the change of the data voltage Vdata supplied to the data line DL.

The parasitic capacitance Cpb may be formed between the touch electrode TE and the data line DL by overlapping the data line DL with the touch electrode TE.

Therefore, crosstalk DTX may occur in the touch sensing signal TSS due to the parasitic capacitance Cpa formed between the touch line TL and the data line DL and the parasitic capacitance Cpb formed between the touch electrode TE and the data line DL.

As described above, noise on the touch sensing signal TSS may occur due to the parasitic capacitance between the touch line TL and the data line DL.

Since a plurality of signal lines are densely arranged in the link area L/A where the driving circuit 160 and the touch line TL and the data line DL are connected to each other, the influence by the parasitic capacitance can be increased.

Figure 7:
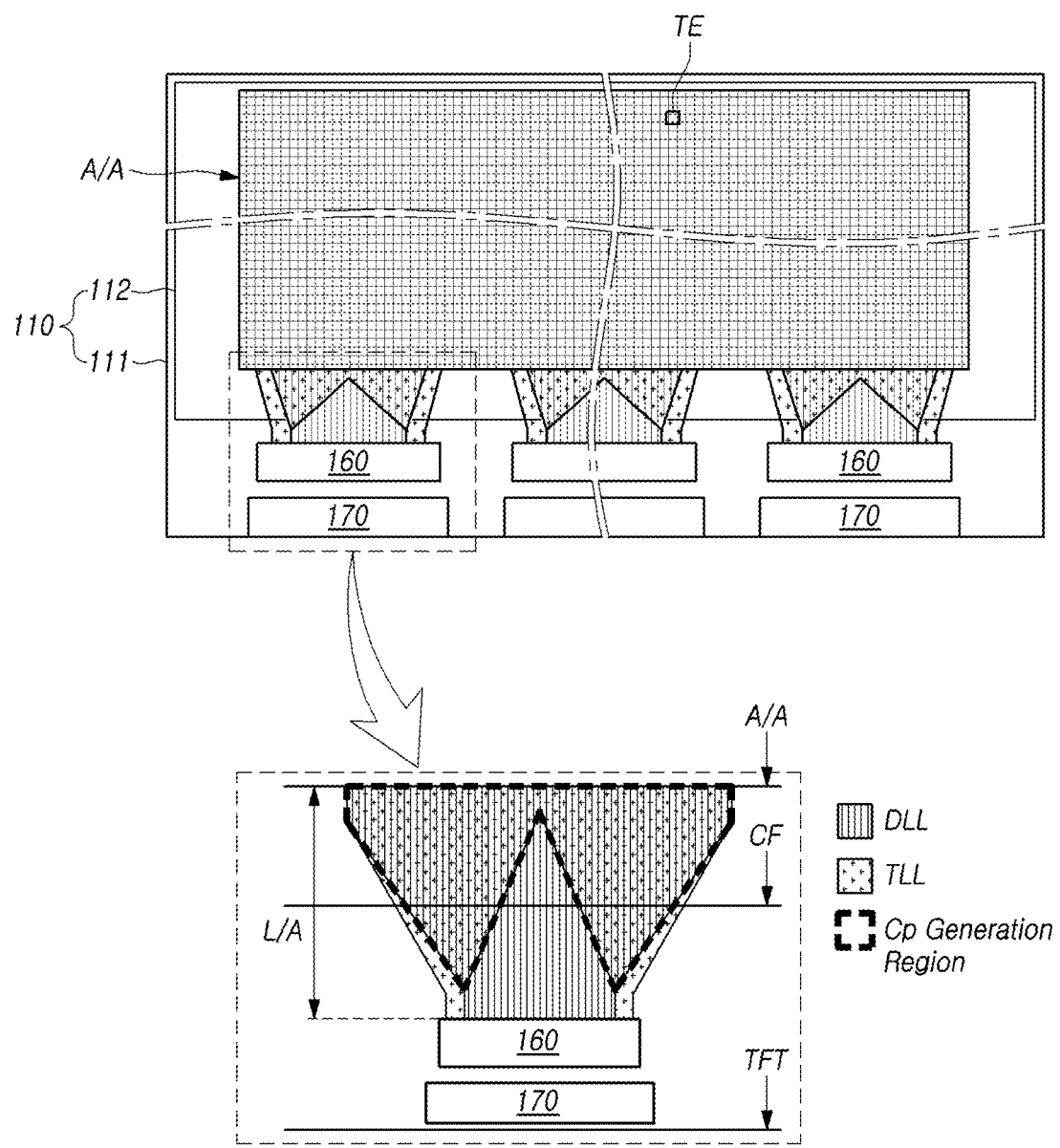
FIG. 7 illustrates an example of a structure in which signal lines are arranged in the link area of the touch display panel.

FIG. 7 illustrates an example of a structure in which signal lines are arranged in the link area L/A of the touch display panel 110.

Referring to FIG. 7, the touch display panel 110 may include, for example, the first substrate 111 and the second substrate 112. Here, the first substrate 110 may be a thin film transistor substrate (TFT), and the second substrate 112 may be a color filter substrate CF.

The plurality of touch electrodes TE, the plurality of touch lines TL, and the plurality of data lines DL may be arranged in the active area A/A of the touch display panel 110. The driving circuit 160, the flexible printed circuit 170 and the like may be disposed in the non-active area N/A, and the plurality of link lines connected to the driving circuit 160 may be disposed in the link area L/A.

For example, the plurality of data link lines DLL electrically connecting the data line DL and the driving circuit 160 disposed in the active area A/A may be disposed in the link area L/A.

Further, the plurality of touch link lines TLL electrically connecting the touch line TL and the driving circuit 160 arranged in the active area A/A may be arranged in the link area L/A.

The data link line DLL and the touch link line TLL may be arranged so that at least a part thereof overlaps with each other.

Therefore, the parasitic capacitance Cp may be generated between the data link line DLL and the touch link line TLL, and noise on the touch sensing signal TSS may occur due to such parasitic capacitance.

In the link area L/A in which the plurality of data link lines DLL and the plurality of touch link lines TLL are densely arranged, the performance of the touch sensing may be improved by reducing the parasitic capacitance between the data link line DLL and the touch link line TLL.

Figure 8:
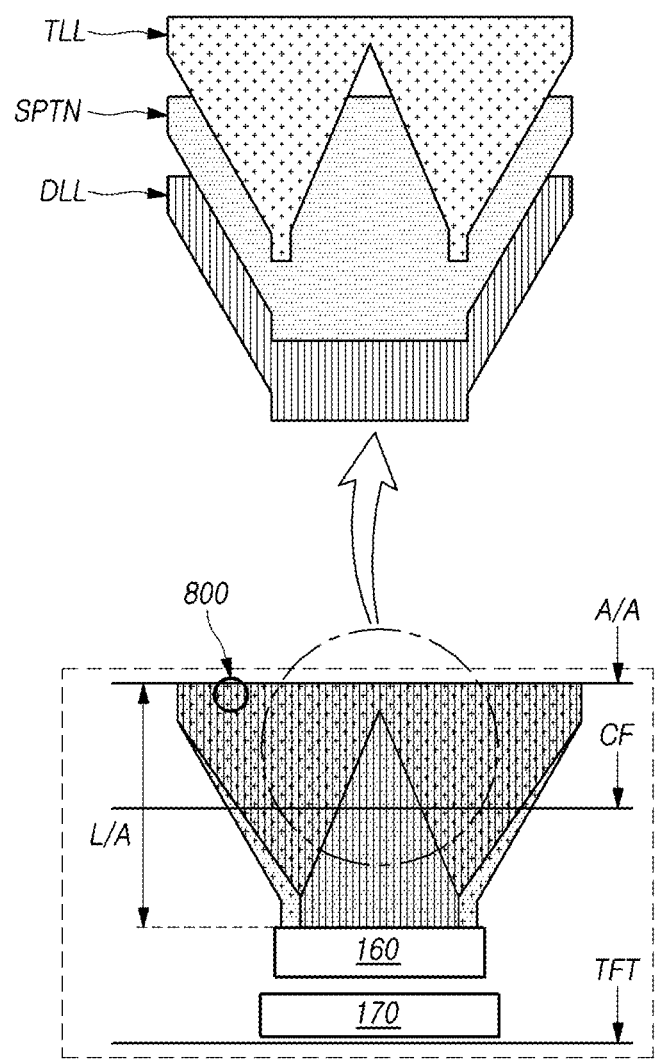
FIG. 8 illustrates an example of a planar structure in which the shielding pattern is disposed in the link area of the touch display panel.
Figure 9:
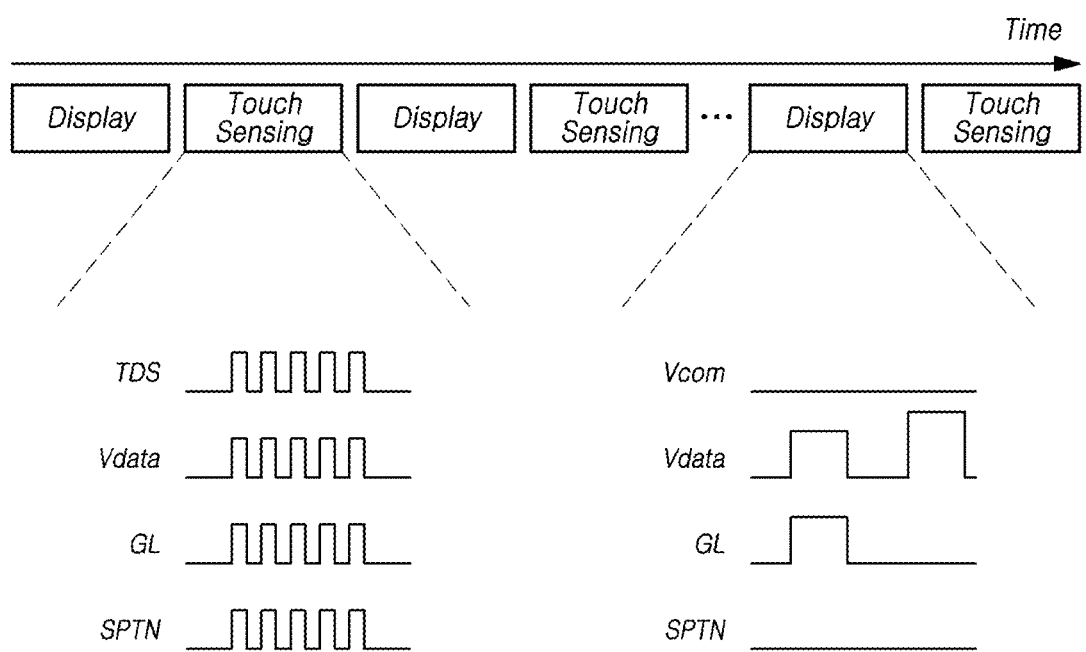
FIGS. 9 and 10 illustrate examples of signals applied to the shielding pattern shown in FIG. 8.
Figure 10:
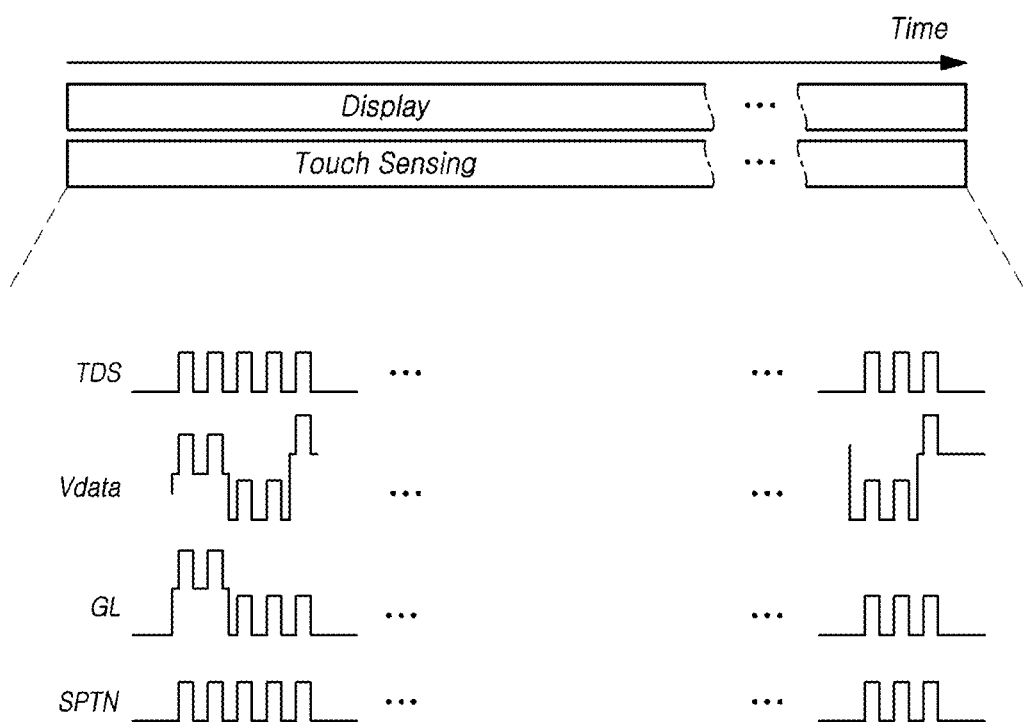

FIG. 8 illustrates an example of a planar structure in which the shielding pattern SPTN is disposed in the link area L/A of the touch display panel 110 in the touch display device 100. Also, FIGS. 9 and 10 illustrate examples of signals applied to the shielding pattern SPTN in FIG. 8.

Referring to FIG. 8, the driving circuit 160 disposed in the touch display panel 110 may be electrically connected to the touch line TL, the data line DL, and the like arranged in the active area A/A by using the plurality of link lines arranged in the link area L/A.

The data link line DLL among the plurality of link lines, for example, may be electrically connected to the central portion of the driving circuit 160 and may be electrically connected to the data line DL disposed in the area driven by the driving circuit 160.

The touch link line TLL may be, for example, electrically connected to a portion adjacent to both sides of the driving circuit 160, and may be electrically connected to the touch line TL disposed in the area driven by the driving circuit 160.

The arrangement structure of the data link line DLL and the touch link line TLL is only an example, and may be arranged differently depending on the case.

Here, the data link line DLL and the touch link line TLL may be disposed on different layers. For example, the touch link line TLL may be disposed on the data link line DLL.

In this case, the shielding pattern SPTN may be disposed on any one of the layers located between the data link line DLL and the touch link line TLL.

The shielding pattern SPTN may be disposed to overlap with at least a portion of the touch link line TLL. As an example, the shielding pattern SPTN may be disposed in an area corresponding to the area in which the touch link line TLL is disposed. Therefore, the parasitic capacitance between the touch link line TLL and the data link line DLL can be prevented from being formed by the shielding pattern SPTN.

Alternatively, the shielding pattern SPTN may be disposed in the area corresponding to the area in which the data link line DLL is disposed. Therefore, the shielding pattern SPTN may prevent the parasitic capacitance from being formed in the vertical direction between the data link line DLL and the touch link line TLL, and may also prevent the parasitic capacitance from being formed in the horizontal direction or the oblique direction between the data link line DLL and the touch link line TLL.

Alternatively, as shown in FIG. 8, the shielding pattern SPTN may be arranged so as to correspond to both the area where the touch link line TLL is disposed and the area where the data link line DLL is disposed. Further, the shielding pattern SPTN may be arranged in the area wider than the area where the data link line DLL is disposed or the area where the touch link line TLL is disposed. In addition, as shown in FIG. 7, the shielding pattern SPTN may be disposed in the link area L/A where the link lines connected to the respective driving circuits 160 are arranged in the case that a plurality of the driving circuits 160 are disposed. At this time, the shielding patterns SPTN disposed in the adjacent link areas L/A may be electrically connected to each other or may be integrally disposed. That is, the shielding pattern SPTN may be disposed entirely in the area between the link area L/A where the link line connected to each of the plurality of driving circuits 160 is arranged and the adjacent link area L/A. And also, the shielding pattern SPTN may be disposed in any sides of the touch display panel 110 which include an area where the touch link line TLL overlaps to the data link line DLL. For example, the shielding pattern SPTN may be disposed in an upper side and a lower side of the touch display panel 110 which includes the driving circuits 160 disposed in both sides of the touch display panel 110.

As described above, the direct parasitic capacitance can be prevented from being formed between the touch link line TLL and the data link line DLL disposed in the link area L/A by disposing the shielding pattern SPTN between the touch link line TLL and the data link line DLL.

Also, the signal corresponding to the touch driving signal TDS applied to the touch link line TLL may be applied to the shielding pattern SPTN. For example, as shown in FIGS. 9 and 10, the signal having the same voltage and phase as the touch driving signal TDS may be applied as the shielding pattern SPTN. As shown in FIG. 9, in the case that display driving and the touch sensing are performed in a time-divided manner, a specific voltage may be applied to the shielding pattern SPTN during a period during which the touch sensing is not performed, that is, during the display driving period. At this time, the specific voltage applied to the shielding pattern SPTN may be the same voltage as the voltage applied to the common electrode disposed on the touch display panel 110. Alternatively, the shielding pattern SPTN may be in a floating state during the display driving period.

The shielding pattern SPTN may be electrically connected to the driving circuit 160 or may be electrically connected to at least one of the plurality of touch link lines TLL, so that the signal corresponding to the touch driving signal TDS may be applied to the shielding pattern SPTN.

Therefore, parasitic capacitance is not formed between the shielding pattern SPTN and the touch link line TLL, so that it is possible to prevent the parasitic capacitance formed between the shielding pattern SPTN and the data link line DLL from indirectly affecting the touch link line TLL.

The shielding pattern SPTN may be formed by adding a separate metal layer between the data link line DLL and the touch link line TLL. Alternatively, the shielding pattern SPTN may be arranged using a metal disposed in a layer positioned between the data link line DLL and the touch link line TLL.

Figure 11A:
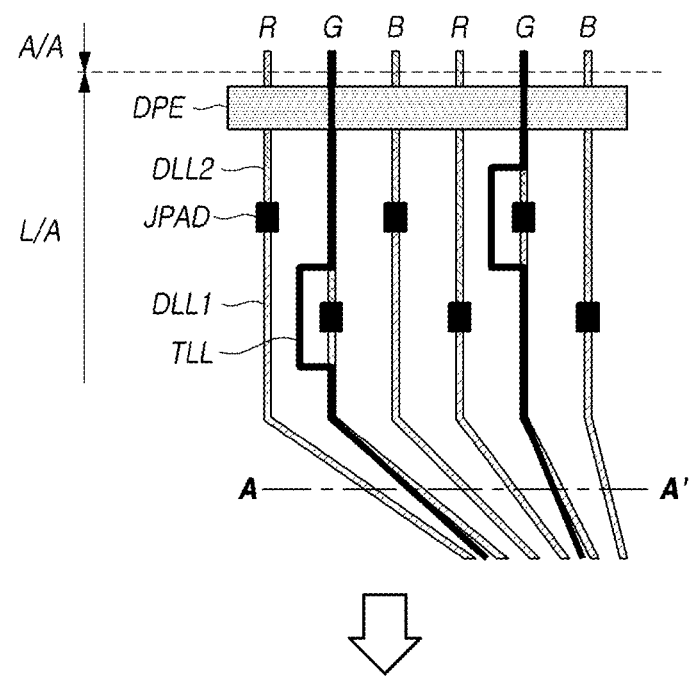
FIGS. 11A and 11B illustrate examples of a planar structure in which the shielding pattern, signal lines and electrodes are arranged in the link area shown in FIG. 8.
Figure 11A:
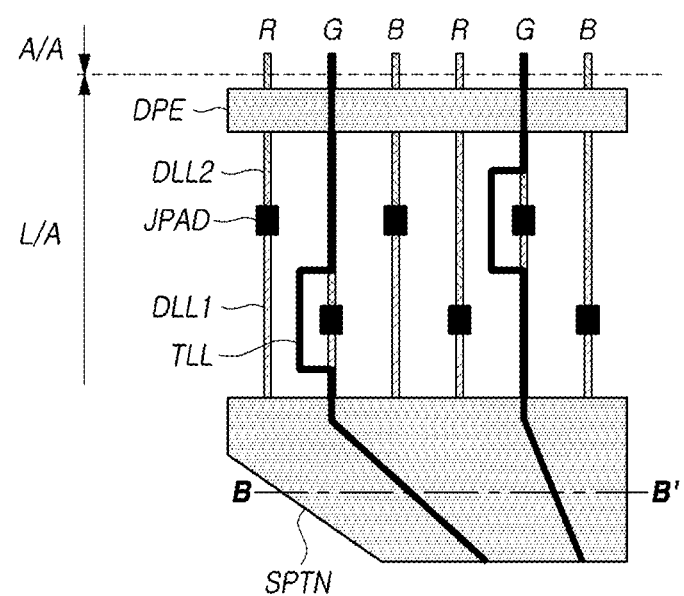
Figure 11B:
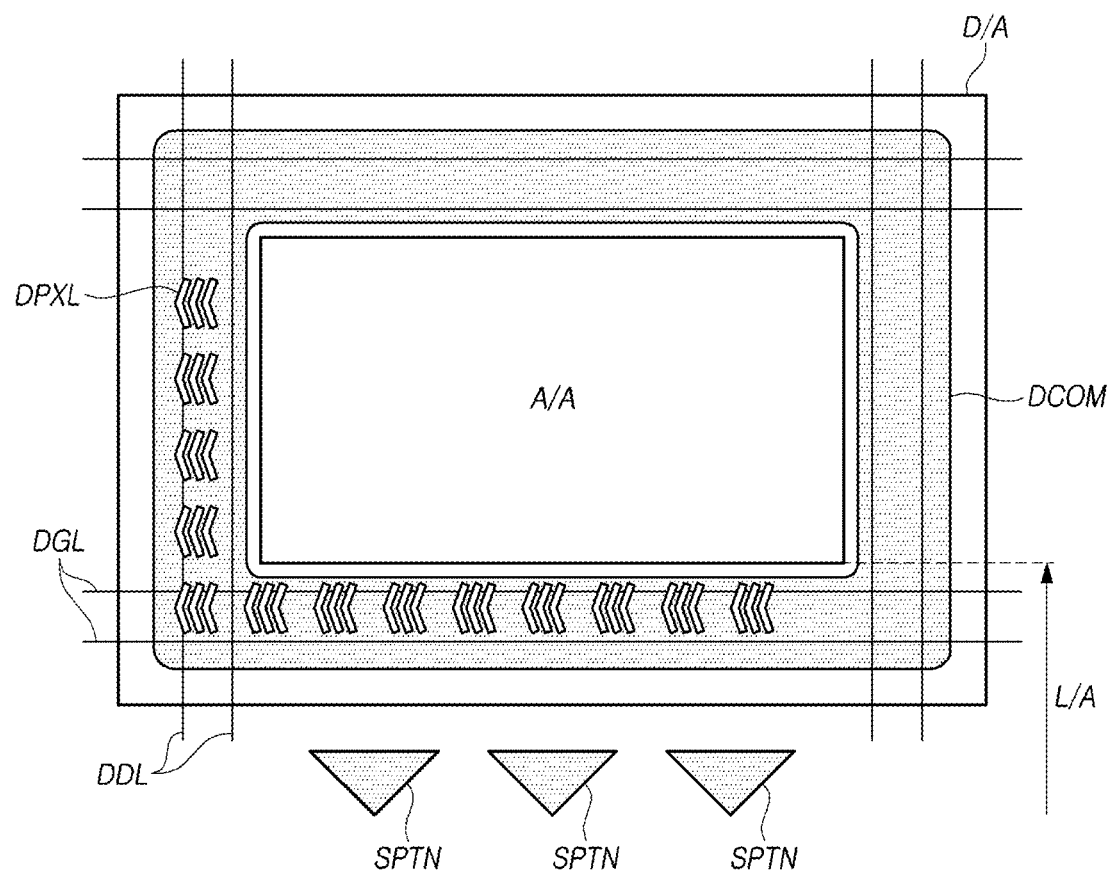

FIGS. 11A and 11B illustrate examples of a planar structure in which the shielding pattern SPTN, various signal lines and electrodes are arranged in the link area L/A shown in FIG. 8. FIG. 11A is an enlarged view of the part 800 in FIG. 8. Also, FIG. 12 illustrates an example of a cross-sectional structure of the portion A-A' and the portion B-B' shown in FIG. 11A.

Figure 12:
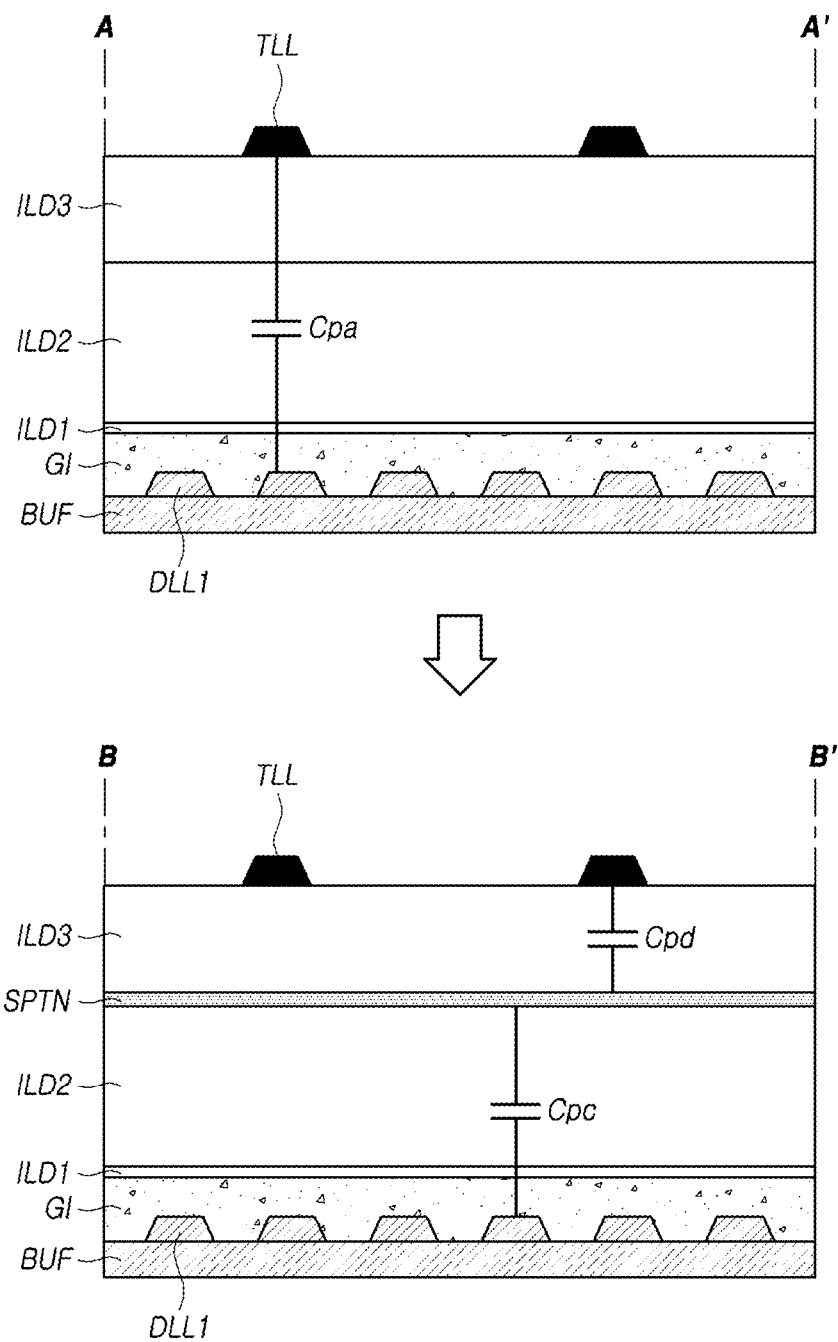
FIG. 12 illustrates an example of a cross-sectional structure of the portion A-A' and the portion B-B' shown in FIG. 11A.

Referring to FIGS. 11A, 11B and 12, the plurality of data link lines DLL and the plurality of touch link lines TLL may be arranged in the link area L/A of the touch display panel 110.

Here, the data link line DLL may be formed of a metal disposed in one layer, or may be formed of two or more metals disposed in different layers.

For example, the data link line DLL disposed in the link area L/A may include the first data link line DLL1 electrically connected to the driving circuit 160, and the second data link line DLL2 electrically connected between the data line DL and the first data link line DLL1.

Here, the first data link line DLL1 may be formed of the gate metal disposed on the touch display panel 110, for example. The second data link line DLL2 may be, for example, formed of the source drain metal disposed on the touch display panel 110.

The first data link line DLL1 may be disposed in a lower layer than the second data link line DLL2.

That is, since the first data link line DLL1 is disposed outside the second data link line DLL2, the first data link line DLL1 may be disposed by using a gate metal disposed below to protect the link line.

The first data link line DLL1 and the second data link line DLL2 may be electrically connected by the jumping pads JPAD disposed on the first data link line DLL1 and the second data link line DLL2.

The jumping pad JPAD may be disposed on the same layer as the layer where the touch link line TLL is disposed, and may be formed of the same material as the material constituting the touch link line TLL. Alternatively, the jumping pad JPAD may be a double jumping structure made of the same material as the touch link line TLL and the same material as the common electrode or the pixel electrode. Alternatively, the jumping pad JPAD may be made of the same material as the common electrode or the pixel electrode.

The plurality of touch link lines TLL may be disposed on the upper layer of the data link line DLL, and at least a portion thereof may overlap the data link line DLL. FIG. 11A illustrates the case where the touch link line TLL overlaps with the data link line DLL for supplying the data voltage Vdata to the green subpixel SP. However, in some cases, the touch link line TLL may be arranged to overlap with the data link line DLL for supplying the data voltage Vdata to the red subpixel SP or the blue subpixel SP. The touch link line TLL may be arranged to bypass the area where the first data link line DLL1 and the second data link line DLL2 are electrically connected to each other, that is, the area where the jumping pad JPAD is disposed.

Here, a dummy electrode DPE may be disposed in the link area L/A outside the active area A/A. This dummy electrode DPE may mean an electrode disposed in a dummy pixel area D/A located outside the active area A/A. For example, a dummy pixel electrode DPXL, a dummy common electrode DCOM, and the like may be disposed in the dummy pixel area D/A, as shown in the example shown in FIG. 11B. Further, a dummy gate line DGL and a dummy data line DDL may be disposed in the dummy pixel area D/A. But it is not necessary that all of the dummy pixel electrode DPXL, the dummy common electrode DCOM, the dummy gate line DGL and the dummy data line DDL are disposed in the dummy pixel area D/A. As required, one or more of dummy lines and dummy electrodes may not be disposed. For example, only the dummy gate line DGL, the dummy data line DDL and the dummy common electrode DCOM may be disposed, and the dummy pixel electrode DPXL is not disposed. The common voltage Vcom may be applied to the dummy pixel electrode DPXL and the dummy common electrode DCOM in the display driving period. Alternatively, the dummy pixel electrode DPXL and the dummy common electrode DCOM may be in the floating state during the display driving period. In the display driving period, the scan signal may be applied to the dummy gate line DGL and the common voltage Vcom may be applied to the dummy data line DDL. Alternatively, the dummy data line DDL may be in the floating state during the display driving period. The touch driving signal TDS applied to the touch electrode TE may be applied to the dummy pixel electrode DPXL and the dummy common electrode DCOM during the touch sensing period. The signal corresponding to the touch driving signal TDS may be applied to the dummy gate line DGL in the touch sensing period. That is, the same signal as the signal applied to the gate line GL disposed in the active area A/A can be applied to the dummy gate line DGL during the touch sensing period. In addition, the signal corresponding to the touch driving signal TDS may be applied to the dummy data line DDL during the touch sensing period. That is, the same signal as the signal applied to the data line DL disposed in the active area A/A can be applied to the dummy data line DDL in the touch sensing period.

The dummy electrode DPE may be disposed on the same layer as the common electrode or the pixel electrode disposed in the active area A/A. The dummy electrode DPE may be formed by connecting a metal disposed on the same layer as the common electrode and the pixel electrode on the outside of the active area A/A. Further, the dummy common electrode DCOM may be further disposed in a region where the dummy pixel electrode DPXL is disposed. The dummy common electrode DCOM may be famed of the same material when the common electrode of the active area A/A is formed. That is, if the common electrode is formed of a transparent conductive material such as ITO, the dummy common electrode DCOM may also be formed of the transparent conductive material such as ITO.

The dummy electrode DPE may be disposed outside the active area A/A, and the same voltage as the voltage applied to the common electrode arranged in the active area A/A may be applied to the dummy electrode DPE. Therefore, it is possible to provide a function of compensating the electric field formed in the subpixel SP disposed outside the active area A/A at the time of the display driving. That is, if the dummy pixel area D/A doesn't exist, an influence of the electric field to the outermost subpixel SP may be different from an influence of the electrode field to an inner subpixel SP of the touch display panel 110 since there are no electrodes outside of the outermost subpixel SP. But if the dummy pixel area D/A exist, circumstances of the outermost subpixel SP in the active area A/A may be similar to the inner subpixel SP in the active area. So, during display driving period, the influence of the electric field could be similar to the outer Lost subpixel SP and the inner subpixel SP by an existence of the dummy pixel area D/A.

Since the dummy electrode DPE is disposed between the data link line DLL and the touch link line TLL in the link area L/A, and the signal applied to the common electrode, that is, the touch electrode TE, is applied, it is possible to prevent parasitic capacitance from being formed between the data link line DLL and the touch link line TLL in the area where the dummy electrode DPE is disposed.

At this time, the shielding pattern SPTN may be disposed in at least a part of the area of the link area L/A excluding the area where the dummy electrode DPE is disposed. Such a shielding pattern SPTN may be formed of the same material of the common electrode when the common electrode of the active area A/A is for ed. That is, for example, in the case that the common electrode is formed of a transparent conductive material such as ITO, the shielding pattern SPTN may be also formed of the transparent conductive material such as ITO. The dummy common electrode DCOM disposed in the area where the dummy pixel electrode DPXL is disposed may be electrically connected to the shielding pattern SPTN to apply the same signal. That is, a 'connection electrode' may be formed between the dummy common electrode DCOM and the shielding pattern SPTN so as to connect the dummy common electrode DCOM electrically to the shielding pattern SPTN.

For example, as illustrated in FIG. 11A, the shielding pattern SPTN may be disposed in a layer between the first data link line DLL1 and the touch link line TLL. The signal corresponding to the signal applied to the touch link line TLL may be applied to the shielding pattern SPTN.

Therefore, it is possible to prevent the occurrence of noise on the touch sensing signal TSS detected through the touch link line TLL due to the direct or indirect parasitic capacitance between the first data link line DLL1 and the touch link line TLL.

Specifically, referring to FIG. 12, the first data link line DLL1 may be disposed on the buffer layer BUF and the gate insulation layer GI may be formed on the first data link line DLL1.

Although not shown in FIG. 12, the second data link line DLL2 may be disposed on the gate insulation layer GI. The first insulation layer ILD1, the second insulation layer ILD2 and the third insulation layer ILD3 may be disposed on the second data link line DLL2 and the touch link line TLL may be disposed on the third insulation layer ILD3.

Here, since the insulation layer disposed in the link area L/A is only an example, less or more insulation layers may be disposed.

Referring to the cross section of the portion A-A' in FIG. 12, the parasitic capacitance Cpa may be formed between the first data link line DLL1 and the touch link line TLL. This parasitic capacitance Cpa may generate the crosstalk DTX in the signal detected through the touch link line TLL.

On the other hand, referring to the cross section of the portion B-B' in FIG. 12, the shielding pattern SPTN may be disposed on any one of the layers located between the first data link line DLL1 and the touch link line TLL.

For example, the shielding pattern SPTN may be disposed between the second insulation layer ILD2 and the third insulation layer ILD3. The shielding pattern SPTN may be disposed on the same layer as the common electrode or the pixel electrode disposed in the active area A/A.

That is, the shielding pattern SPTN may be disposed in the link area L/A in the process of disposing the common electrode or the pixel electrode.

It is possible to prevent direct parasitic capacitance from being formed between the first data link line DLL1 and the touch link line TLL by the shielding pattern SPTN.

The signal corresponding to the signal applied to the touch link line TLL may be applied to the shielding pattern SPTN. For example, signals or voltages necessary for the dummy common electrode DCOM and the shielding pattern SPTN can be supplied through the driving circuit 160 or the flexible printed circuit 170, respectively. That is, the driving circuit 160 or the flexible printed circuit 170 can supply a necessary signal or voltage to the dummy common electrode DCOM and the shielding pattern SPTN through respective separate signal lines. As another example, the driving circuit 160 or the flexible printed circuit 170 can supply a signal or voltage necessary for the dummy common electrode DCOM directly through the signal line. At this time, the shielding pattern SPTN may be electrically connected to the dummy common electrode DCOM via the 'connection electrode' so as to be applied with the necessary signal or voltage indirectly. As another example, the driving circuit 160 or the flexible printed circuit 170 may supply the signal or voltage necessary for the shielding pattern SPTN directly through the signal line. At this time, the dummy common electrode DCOM may be electrically connected to the shielding pattern SPTN through the 'connection electrode' so as to be applied with the necessary signal or voltage indirectly.

Therefore, even if the parasitic capacitance Cpc is formed between the shielding pattern SPTN and the first data link line DLL1, since the parasitic capacitance Cpd is not formed between the shielding pattern SPTN and the touch link line TLL (equal potential), it is possible to prevent noise from being generated in the touch sensing signal TSS detected through the touch link line TLL due to the voltage variation of the first data link line DLL1.

Here, the shielding pattern SPTN may be disposed in the layer where the source drain metal is disposed among the layers located between the first data link line DLL1 and the touch link line TLL.

Figure 13:
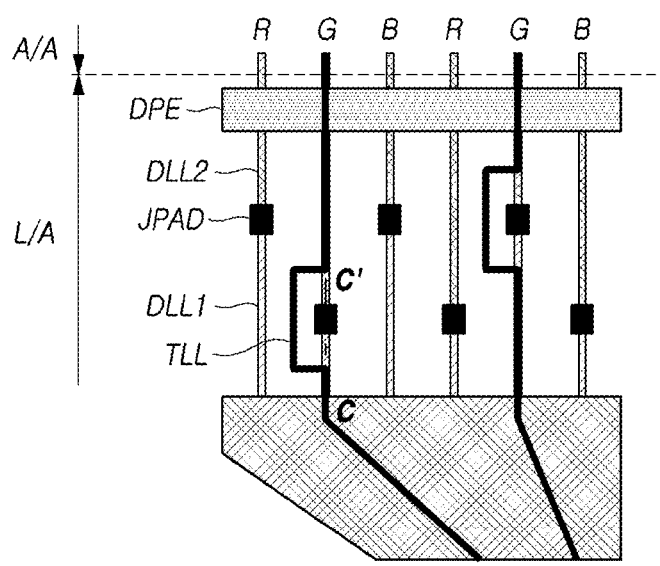
FIG. 13 illustrates another example of the planar structure in which the shielding pattern and signal lines are arranged in the link area shown in FIG. 8.

FIG. 13 illustrates another example of the planar structure in which the shielding pattern SPTN and signal lines are arranged in the link area shown in FIG. 8. FIG. 13 illustrates an enlarged structure of the portion 800 in FIG. 8, and FIG. 14 illustrates an example of the cross-sectional structure of a portion C-C' of FIG. 13.

Figure 14:
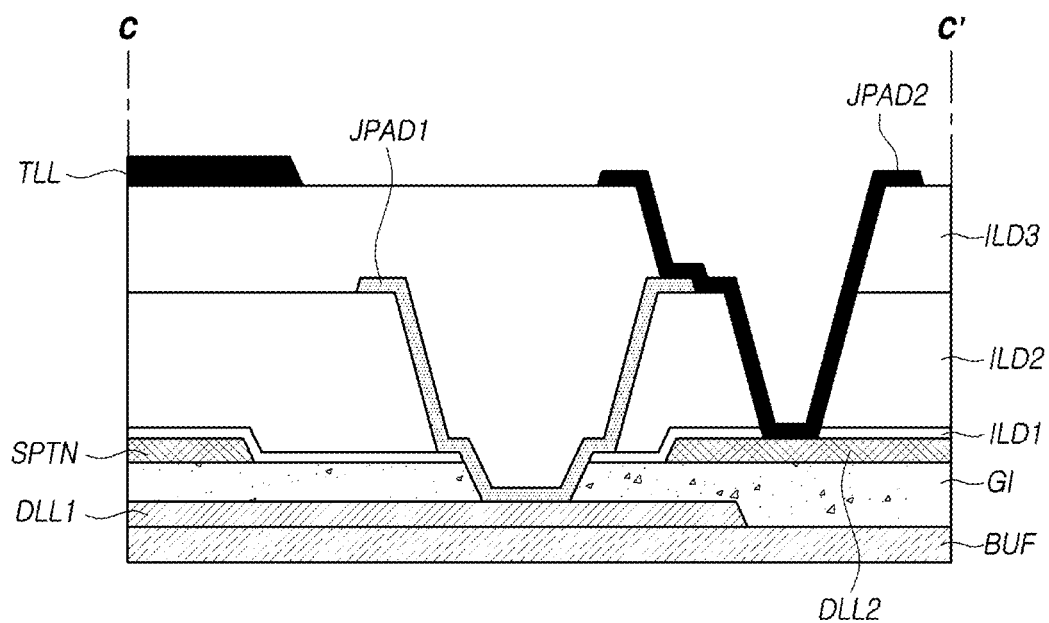
FIG. 14 illustrates an example of the cross-sectional structure of a portion C-C' of FIG. 13.

Referring to FIG. 13 and FIG. 14, the plurality of data link lines DLL and the plurality of touch link lines TLL may be arranged in the link area L/A of the touch display panel 110.

The data link line DLL may include the first data link line DLL1 and the second data link line DLL2. The first data link line DLL1 and the second data link line DLL2 may be electrically connected to each other by the jumping pad JPAD. The jumping pad JPAD may be, for example, made of the same material as the touch link line TLL, or may be made of the same material as the pixel electrode or the common electrode. Alternatively, the jumping pad JPAD may be a double jumping structure formed by two or more materials. FIG. 14 illustrates an exemplary double jumping structure. For example, the jumping pad (JPAD) may be formed by the first jumping pad JPAD1 made of the same material as the common electrode and the second jumping pad JPAD2 made of the same material as the touch link line TLL A.

Here, the shielding pattern SPTN may be disposed between the first data link line DLL1 and the touch link line TLL. The shielding pattern SPTN may be disposed in the same layer as the second data link line DLL2 and may be disposed in isolation from the second data link line DLL2.

That is, the shielding pattern SPTN may be disposed using the source drain metal in the process of disposing the second data link line DLL2.

Specifically, referring to FIG. 14, the first data link line DLL1 may be disposed on the buffer layer BUF, and the gate insulation layer GI may be disposed on the first data link line DLL1.

The second data link line DLL2 may be disposed on the gate insulation layer GI and the second data link line DLL2 may be electrically connected to the first data link line DLL1 by the jumping pad JPAD.

Here, the shielding pattern SPTN may be disposed on at least a part of the area where the second data link line DLL2 is not disposed on the gate insulation layer GI.

The first insulation layer ILD1, the second insulation layer ILD2 and the third insulation layer ILD3 may be disposed on the shielding pattern SPTN, and the touch link line TLL may be disposed on the third insulation layer ILD3.

That is, the shielding pattern SPTN of the source drain metal may be disposed in an area excluding the area where the second data link line DLL2 is disposed and the area where the jumping pad JPAD is disposed in the link area L/A. Further, the shielding pattern SPTN may be further disposed in the layer where the dummy pixel electrode DPXL is disposed. That is, the shielding pattern SPTN may be arranged in double layers of the layer in which the source drain metal is disposed and the layer in which the dummy pixel electrode DPXL is disposed, so that it is possible to enhance the effect of reducing the parasitic capacitance between the first data link line DLL1 and the touch line TL.

The shielding pattern SPTN is disposed in the same layer as the second data link line DLL2 as described above, so that the shielding pattern SPTN can be disposed between the first data link line DLL1 and the touch link line TLL without the additional process.

Also, since the signal corresponding to the signal applied to the touch link line TLL is applied to the shielding pattern SPTN, the noise on the touch sensing signal TSS due to the parasitic capacitance between the first data link line DLL1 and the touch link line TLL can be reduced.

Further, in accordance with the connection structure of the first data link line DLL1 and the second data link line DLL2 in the link area L/A, the shielding pattern SPTN may be disposed up to the area between the second data link line DLL2 and the touch link line TLL.

Figure 15A:
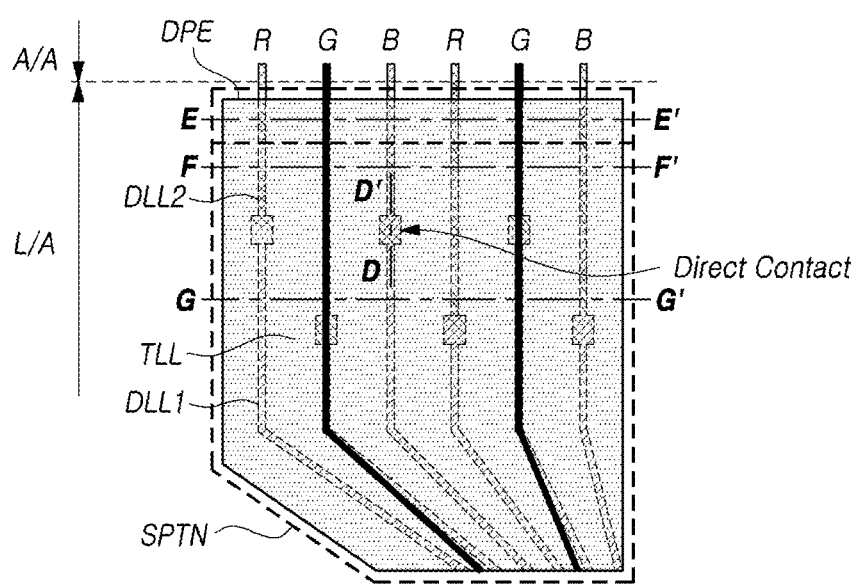
FIGS. 15A and 15B illustrate another example of a planar structure in which the shielding pattern, signal lines and electrodes are arranged in the link area shown in FIG. 8.
Figure 15B:
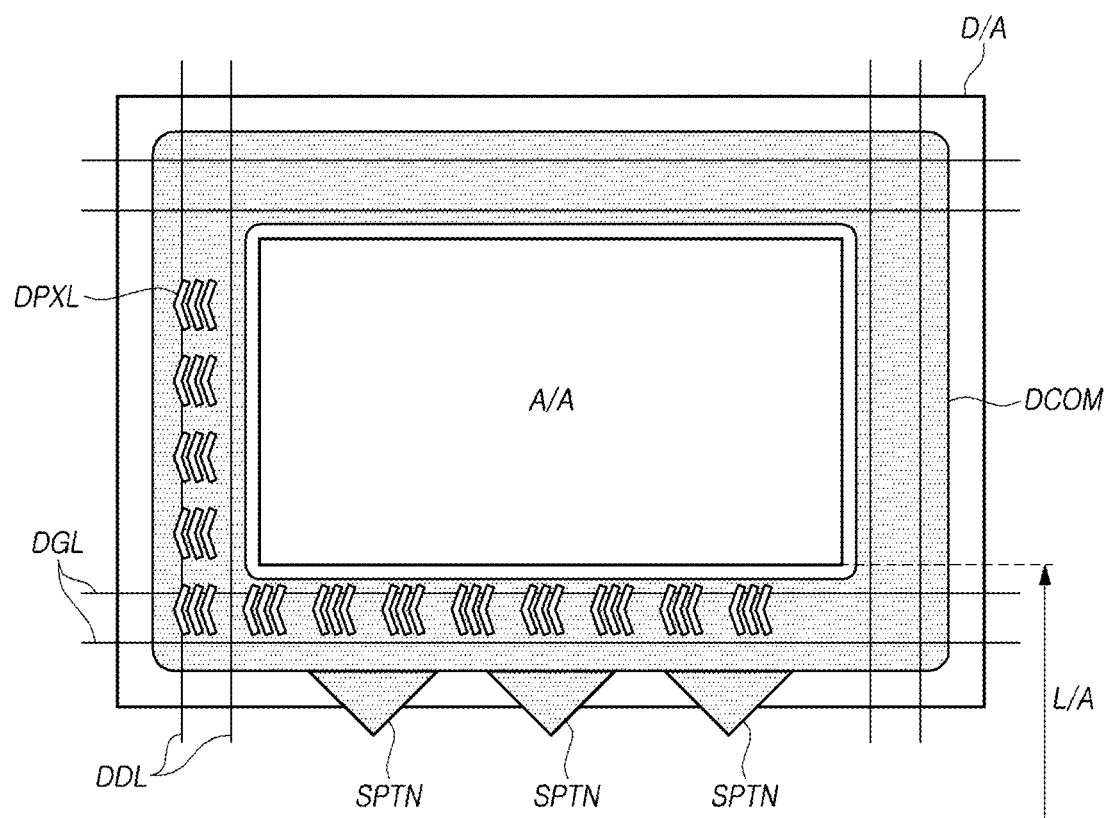

FIGS. 15A and 15B illustrate another example of a planar structure in which the shielding pattern SPTN, signal lines and electrodes are arranged in the link area shown in FIG. 8. FIG. 15A illustrates another example of the enlarged structure of the 800 portion in FIG. 8. Also, the FIGS. 16A to 16D illustrate partial cross-sectional structures in the plane structure shown in FIG. 15A.

Referring to FIG. 15A, FIG. 15B and FIGS. 16A to 16D, the plurality of data link lines DLL and the plurality of touch link lines TLL may be arranged in the link area L/A of the touch display panel 110.

The data link line DLL may include the first data link line DLL1 and the second data link line DLL2.

Figure 16A:
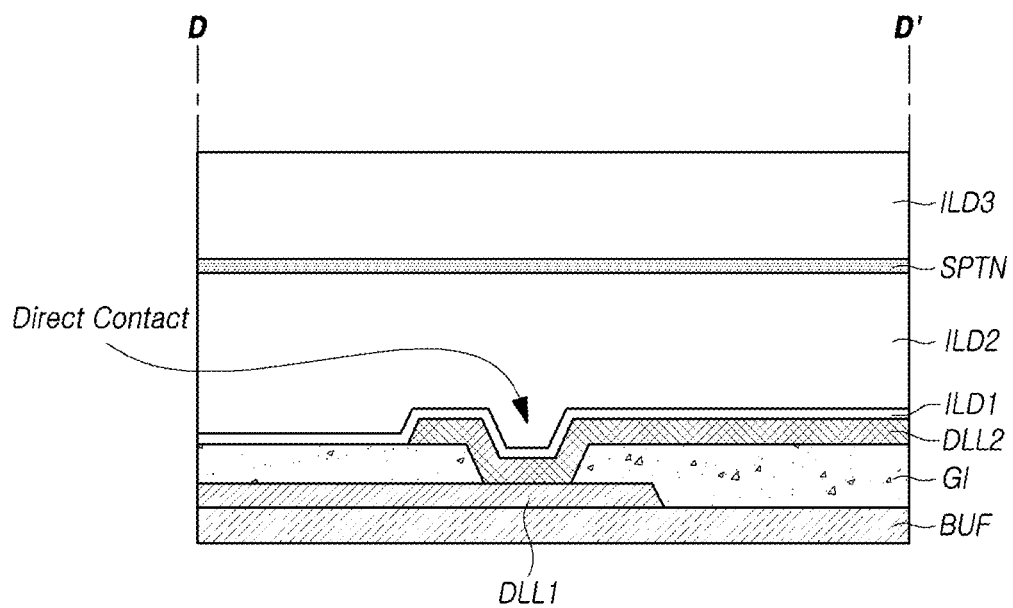
FIGS. 16A to 16D illustrate examples of cross-sectional structures of the portions D-D', E-E', F-F' and G-G' shown in FIG. 15A.

Here, the first data link line DLL1 and the second data link line DLL2 may be directly connected by the contact hole included in the gate insulation layer GI disposed between the first data link line DLL1 and the second data link line DLL2, as shown in the example of FIG. 16A.

That is, the first data link line DLL1 and the second data link line DLL2 may be directly connected without being connected by the jumping pads JPAD, so that the shielding pattern SPTN may be arranged up to the area between the second data link line DLL2 and the touch link line TLL. In this case, the touch link line TLL can be arranged without bypassing the area where the first data link line DLL1 and the second data link line DLL2 are connected.

The shielding pattern SPTN may be disposed between the first data link line DLL1, the second data link line DLL2 and the touch link line TLL in the link area L/A, and may be disposed in the same layer as the layer where the common electrode or the pixel electrode is disposed.

The shielding pattern SPTN may be electrically connected to at least one of the dummy pixel electrode DPXL and the dummy common electrode DCOM disposed outside the active area A/A. As illustrated in FIG. 15A, the shielding pattern SPTN and the dummy electrode DPE may be integrally formed, or the shielding pattern SPTN and the dummy common electrode DCOM disposed in the dummy pixel area D/A may be formed integrally as shown in the example of FIG. 15B. That is, the material of the shielding pattern SPTN material may be the same material as the dummy electrode DPE. As another example, the shielding pattern SPTN, the dummy common electrode DCOM and the connection electrode may all be formed of the same material and may be disposed integrally.

Therefore, there may be not required the separate connection structure for applying the signal corresponding to the signal applied to the touch link line TLL to the shielding pattern SPTN.

Further, since the parasitic capacitance may be not formed between the first data link line DLL1, the second data link line DLL2 and the touch link line TLL in the link area L/A by the shielding pattern SPTN and the dummy electrode DPE, the noise on the touch sensing signal TSS can be further reduced.

Figure 16B:
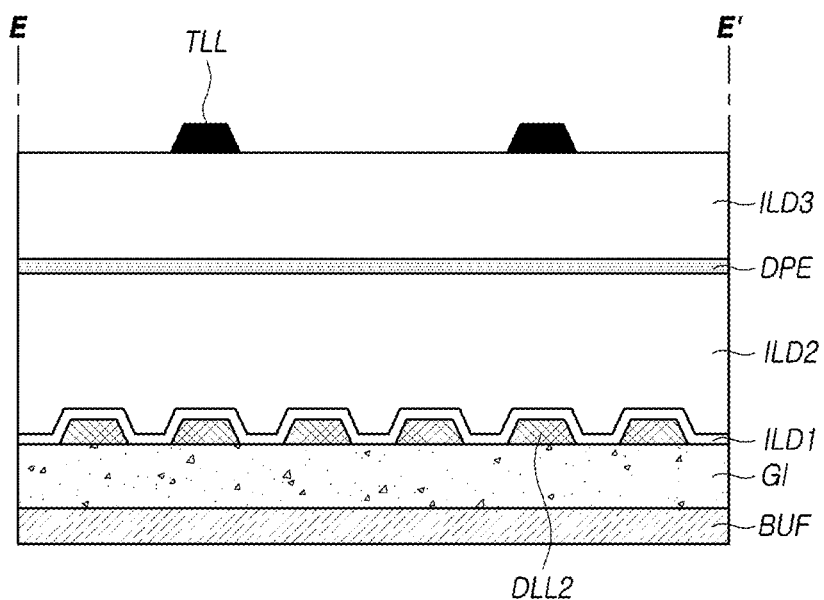

For example, referring to FIG. 16B, in the link area L/A adjacent to the active area A/A, it is possible to prevent the parasitic capacitance from being formed between the second data link line DLL2 and the touch link line TLL by the dummy electrode DPE.

Figure 16C:
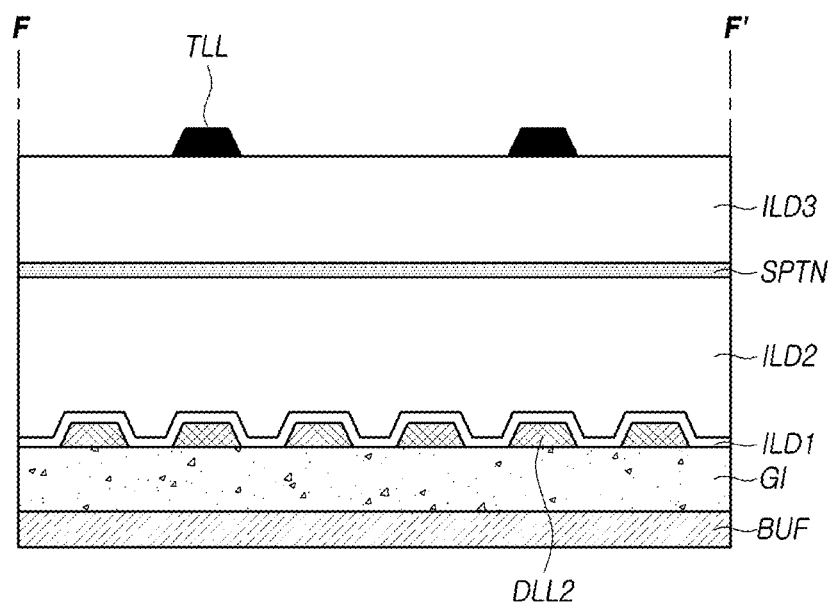

Referring to FIG. 16C, it is possible to prevent parasitic capacitance from being formed between the second data link line DLL2 and the touch link line TLL by the shielding pattern SPTN disposed outside the dummy electrode DPE.

Figure 16D:
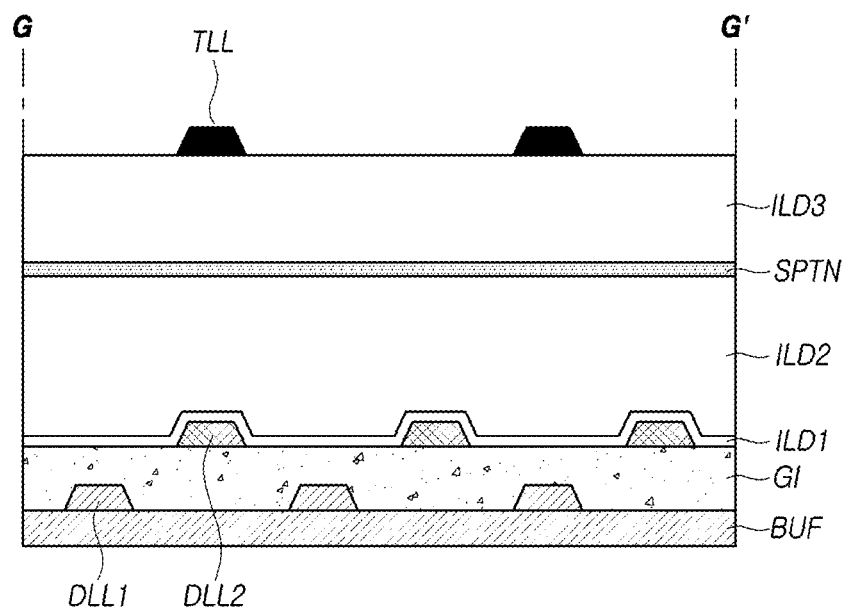

Further, referring to FIG. 16D, between the areas where the first data link line DLL1 and the second data link line DLL2 are connected to each other, the shielding pattern SPTN may be disposed between the touch link line TLL, the first data link line DLL1 and the second data link line DLL2.

Therefore, it is possible to prevent noise from being generated in the signal detected in the touch link line TLL by the data link line DLL composed of the first data link line DLL1 and the second data link line DLL2.

As described above, the shielding pattern SPTN may be disposed in all areas between the data link line DLL and the touch link line TLL by using the structure in which the first data link line DLL1 and the second data link line DLL2 are directly connected in the link area L/A. As a result, the noise on the touch sensing signal TSS due to the voltage fluctuation of the data link line DLL can be reduced.

Further, in the structure in which the first data link line DLL1 and the second data link line DLL2 are connected by the jumping pad JPAD made of at least one of the same material as the touch link line TLL and the same material as the common electrode or the pixel electrode, the shielding pattern SPTN may be disposed in at least a part of the area excluding the area where the jumping pad JPAD is disposed.

That is, the shielding pattern SPTN may be arranged in a structure in which the region corresponding to the jumping pad JPAD is opened. The shielding pattern SPTN may be insulated from the jumping pad JPAD and may be arranged to overlap the area corresponding to the touch link line TLL.

The shielding pattern SPTN may be disposed between at least a portion of the first data link line DLL1 and at least a portion of the second data link line DLL2, and the touch link line TLL, so that it is possible to prevent the parasitic capacitance between the data link line DLL and the touch link line TLL from being formed.

Thus, even in the structure in which the first data link line DLL1 and the second data link line DLL2 are connected by the jumping pads JPAD, the noise on the touch sensing signal TSS due to the parasitic capacitance can be minimized by using the arrangement of the shielding pattern SPTN.

In summary, the shielding pattern SPTN is disposed between the data link line DLL and the touch link line TLL in the link area L/A of the touch display panel 110 so that it is possible to prevent the direct parasitic capacitance from being formed between the data link line DLL and the touch link line TLL.

In addition, since the signal corresponding to the touch driving signal TDS applied to the touch link line TLL is applied to the shielding pattern SPTN, the parasitic capacitance is not formed between the shielding pattern SPTN and the touch link line TLL. Thus, it is possible to prevent parasitic capacitance between the shielding pattern SPTN and the data link line DLL from affecting the touch link line TLL.

Also, in accordance with the connection structure of the data link line DLL in the link area L/A, it is possible to arrange the shielding pattern SPTN in the entire area between the data link line DLL and the touch link line TLL, so as to reduce the noise on the touch sensing signal TSS due to the parasitic capacitance of the data link line DLL.

Accordingly, noise on the touch sensing signal TSS due to the display driving can be prevented to improve the performance of the touch sensing, and the touch sensing can be performed simultaneously with the display driving.

It will be apparent to those skilled in the art that various modifications and variations can be made in the present disclosure without departing from the technical idea or scope of the disclosure. Thus, it is intended that the present disclosure cover the modifications and variations of this disclosure provided they come within the scope of the appended claims and their equivalents.

The invention claimed is:

1. A touch display panel, comprising:
   at least one driving circuit for driving a plurality of data lines and a plurality of touch lines arranged in an active area of the touch display panel;
   a plurality of data link lines disposed in a non-active area of the touch display panel and electrically connected between the driving circuit and each of the plurality of data lines;
   a plurality of touch link lines disposed in the non-active area and electrically connected between the driving circuit and each of the plurality of touch lines, at least a portion of the touch link lines overlapping with at least one of the plurality of data link lines; and
   a shielding pattern disposed in the non-active area and disposed between the plurality of data link lines and the plurality of touch link lines, the shielding pattern overlapping at least a portion of the plurality of touch link lines.

2. The touch display panel of claim 1, wherein the plurality of data link lines comprise:
   a plurality of first data link lines electrically connected to the driving circuit; and
   a plurality of second data link lines electrically connected between each of the plurality of first data link lines and each of the plurality of data lines, and
   wherein the shielding pattern is disposed between the plurality of first data link lines and the plurality of touch link lines.

3. The touch display panel of claim 2, wherein the plurality of first data link lines are disposed between a buffer layer and a gate insulation layer and the plurality of second data link lines are disposed on the gate insulation layer.

4. The touch display panel of claim 2, wherein the plurality of first data link lines are formed of a gate metal disposed on the touch display panel and the plurality of second data link lines are formed of a source metal and a drain metal disposed on the touch display panel.

5. The touch display panel of claim 2, wherein the shielding pattern is further disposed between the plurality of second data link lines and the plurality of touch link lines.

6. The touch display panel of claim 1, wherein the shielding pattern is electrically connected to the driving circuit or at least one of the plurality of touch link lines.

7. The touch display panel of claim 1, further comprising:
   a dummy pixel area located outside the active area, in which a dummy pixel electrode and a dummy common electrode are disposed.

8. The touch display panel of claim 7, wherein the shielding pattern is formed integrally with at least one of the dummy pixel electrode and the dummy common electrode disposed outside the active area.

9. The touch display panel of claim 2, wherein the first data link line and the second data link line are electrically connected to each other through at least one contact hole included in an insulation layer disposed between the first data link line and the second data link line.

10. The touch display panel of claim 2, wherein the first data link line and the second data link line are electrically connected to each other by a jumping pad made of the same material as the shielding pattern.

11. The touch display panel of claim 10, wherein the shielding pattern is not disposed in the area of the jumping pad and is insulated from the jumping pad, and
    wherein at least a portion of the shielding pattern is disposed between the plurality of second data link lines and the plurality of touch link lines.

12. The touch display panel of claim 2, wherein the first data link line and the second data link line are electrically connected to each other by a jumping pad made of the same material as the touch link line, and
    wherein the plurality of touch link lines are arranged to bypass an area where the first data link line and the second data link line are electrically connected to each other.

13. The touch display panel of claim 2, wherein the first data link line and the second data link line are electrically connected to each other by a double jumping structure made of the same material as the plurality of touch link lines and the same material as a common electrode or a pixel electrode.

14. The touch display panel of claim 2, wherein the shielding pattern is disposed in the same layer as the plurality of second data link lines and is insulated from the plurality of second data link lines.

15. The touch display panel of claim 7, wherein the shielding pattern is electrically connected to at least one of the driving circuit, the plurality of touch link lines, the dummy pixel electrode and the dummy common electrode disposed outside the active area.

16. The touch display panel of claim 2, wherein the driving circuit is configured to output a pulse-shaped touch driving signal to at least one of the touch link lines during at least a part of a display driving period.

17. The touch display panel of claim 16, wherein the driving circuit is configured to output a data voltage modulated based on the touch driving signal to at least one of the first data link lines during the display driving period.

18. The touch display panel of claim 1, wherein the driving circuit is configured to output a pulse-shaped touch driving signal to the plurality of touch link lines during at least a touch sensing period, and to output a signal corresponding to the touch driving signal to the shielding pattern during at least the touch sensing period, and
    wherein the signal corresponding to the touch driving signal is either identical to the touch driving signal or has an identical phase and identical voltage difference as those of the touch driving signal.

19. The touch display panel of claim 7, wherein the touch display panel is configured to apply a common voltage to the dummy pixel electrode and the dummy common electrode in a display driving period.

20. The touch display panel of claim 7, wherein the dummy pixel electrode and the dummy common electrode are in the floating state during a display driving period.

21. The touch display panel of claim 7, wherein the dummy common electrode is electrically connected to the shielding pattern such that the same signal are applied to the dummy common electrode and the shielding pattern.

22. The touch display panel of claim 19, wherein the dummy pixel area further comprises a dummy gate line and/or a dummy data line, and the touch display panel is configured to apply the common voltage to the dummy data line and to apply a scan signal to the dummy gate line.

23. A touch display device comprising the touch display panel according to any one of claim 1.

* * * * *